United States Patent
Suzuki (10) Patent No.: US 10,064,232 B2
(45) Date of Patent: Aug. 28, 2018

(54) NON-TRANSITORY COMPUTER READABLE STORAGE MEDIUM FOR TERMINAL DEVICE

(71) Applicant: Brother Kogyo Kabushiki Kaisha, Nagoya-shi, Aichi-ken (JP)

(72) Inventor: Satoshi Suzuki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/472,547

(22) Filed: Mar. 29, 2017

(65) Prior Publication Data

US 2017/0290078 A1    Oct. 5, 2017

(30) Foreign Application Priority Data

Mar. 29, 2016   (JP) .................................. 2016-066478

(51) Int. Cl.
*H04B 7/00* (2006.01)
*H04B 15/00* (2006.01)
(Continued)

(52) U.S. Cl.
CPC .......... *H04W 76/14* (2018.02); *H04B 5/0031* (2013.01); *H04W 4/008* (2013.01);
(Continued)

(58) Field of Classification Search
CPC . H04W 76/023; H04W 4/008; H04W 76/025; H04W 84/20; H04B 5/0031
(Continued)

(56) References Cited

U.S. PATENT DOCUMENTS 7,249,174 B2 * 7/2007 Srinivasa ................ G06F 9/466
                                                        709/223
8,159,706 B2 * 4/2012 Kato ........................ G01C 21/26
                                                        358/1.15
(Continued)

FOREIGN PATENT DOCUMENTS

EP        2645811 A2    10/2013
JP     2015-231156 A    12/2015

OTHER PUBLICATIONS

Wi-Fi Alliance Technical Committee P2P Task Group, "Wi-Fi Peer-to Peer (P2P) Technical Specification", Version 1.1, pp. 1-159, 2010.

(Continued)

*Primary Examiner* — Tilahun B Gesesse
(74) *Attorney, Agent, or Firm* — Banner & Witcoff, Ltd.

(57) ABSTRACT

A terminal device may: shift an operating state of the terminal device from a non-parent station state to a parent station state so as to form a wireless network if a predetermined trigger instruction is given; establish a wireless connection with the first communication device, in a case where a first communication link is established with a first communication device; send predetermined setting information to the first communication device; establish a wireless connection with the second communication device in a case where a second communication link is established with a second communication device; and send the predetermined setting information to the second communication device.

14 Claims, 4 Drawing Sheets

(51) Int. Cl.
- *H04W 76/14* (2018.01)
- *H04W 76/15* (2018.01)
- *H04W 4/80* (2018.01)
- *H04B 5/00* (2006.01)
- *H04W 4/00* (2018.01)
- *H04W 76/02* (2009.01)
- *H04W 84/20* (2009.01)

(52) U.S. Cl.
CPC ........... *H04W 4/80* (2018.02); *H04W 76/023* (2013.01); *H04W 76/025* (2013.01); *H04W 76/15* (2018.02); *H04W 84/20* (2013.01)

(58) Field of Classification Search
USPC .............................................. 455/41.1, 41.2

See application file for complete search history.

(56) References Cited

U.S. PATENT DOCUMENTS

| | | | |
|---|---|---|---|
| 9,292,233 | B2 | 3/2016 | Kurihara |
| 9,866,992 | B2* | 1/2018 | Asakura ................. H04W 4/008 |
| 2013/0215467 | A1* | 8/2013 | Fein ....................... G06F 3/1204 |
| | | | 358/1.15 |
| 2013/0260683 | A1 | 10/2013 | Suzuki et al. |
| 2015/0188609 | A1* | 7/2015 | Inoue ................... H04B 5/0037 |
| | | | 455/41.1 |
| 2015/0268903 | A1 | 9/2015 | Baba |
| 2015/0286452 | A1 | 10/2015 | Kim et al. |
| 2015/0359021 | A1* | 12/2015 | Tsujii .................. H04W 76/023 |
| | | | 455/41.1 |
| 2015/0373763 | A1 | 12/2015 | Ren et al. |
| 2016/0295567 | A1* | 10/2016 | Nogawa ................ H04W 8/005 |

OTHER PUBLICATIONS

Sep. 1, 2017—(EP) Search Report—App 17163650.9.

* cited by examiner

NON-TRANSITORY COMPUTER READABLE STORAGE MEDIUM FOR TERMINAL DEVICE

TECHNICAL FIELD

The technique disclosed herein concerns a terminal device capable of sending setting information to a communication device.

DESCRIPTION OF RELATED ART

A mobile device capable of communicating with each of a first image forming device and a second image forming device is known. The mobile device establishes a Wi-Fi connection or a Bluetooth (registered trademark) connection with the first image forming device by using information received from the first image forming device in accordance with NFC (abbreviation of Near Field Communication) scheme, and receives predetermined information including a setting value of the first image forming device in accordance with Wi-Fi scheme or Bluetooth scheme from the first image forming device. Further, the mobile device establishes the Wi-Fi connection or the Bluetooth connection with the second image forming device by using information received from the second image forming device in accordance with the NFC scheme, and sends the predetermined information to the second image forming device in accordance with the Wi-Fi scheme or the Bluetooth scheme. The second image forming device updates a setting value being currently set on the second image forming device to the setting value included in the predetermined information.

SUMMARY

In the above technique, no considerations are given to a situation where the mobile device should send the predetermined information to each of a plurality of devices. The present disclosure provides a technique which may reduce processing load of a terminal device in a situation where the terminal device should send, to a plurality of the communication devices, predetermined information which is to be set in the plurality of communication devices.

The present disclosure provides a non-transitory computer-readable storage medium storing a computer program including computer-readable instructions for a terminal device, wherein the computer-readable instructions, when executed by a processor of the terminal device, may cause the terminal device to: shift an operating state of the terminal device from a non-parent station state to a parent station state so as to form a wireless network if a predetermined trigger instruction is given, the non-parent station state being a state in which the terminal device does not operate as a parent station of the wireless network, the parent station state being a state in which the terminal device operates as the parent station of the wireless network, and the wireless network being for executing a wireless communication via a first wireless interface of the terminal device; establish a wireless connection with a first communication device via the first wireless interface so as to cause the first communication device to join the wireless network in which the terminal device operates as the parent station, in a case where a first communication link via a second wireless interface of the terminal device is established with the first communication device, the second wireless interface being different from the first wireless interface; send predetermined setting information to the first communication device via the first wireless interface by using the wireless network; establish a wireless connection with a second communication device via the first wireless interface so as to cause the second communication device to join the wireless network in which the terminal device maintains to operate as the parent station, in a case where a second communication link via the second wireless interface is established with the second communication device while the operating state of the terminal device is maintained as the parent station state without being shifted to the non-parent station state after having been shifted to the parent station state; and send the predetermined setting information to the second communication device via the first wireless interface by using the wireless network.

The terminal device itself realized by the above-described computer-readable instructions, and a method performed by the terminal device, are also novel and useful.

Figure 1:
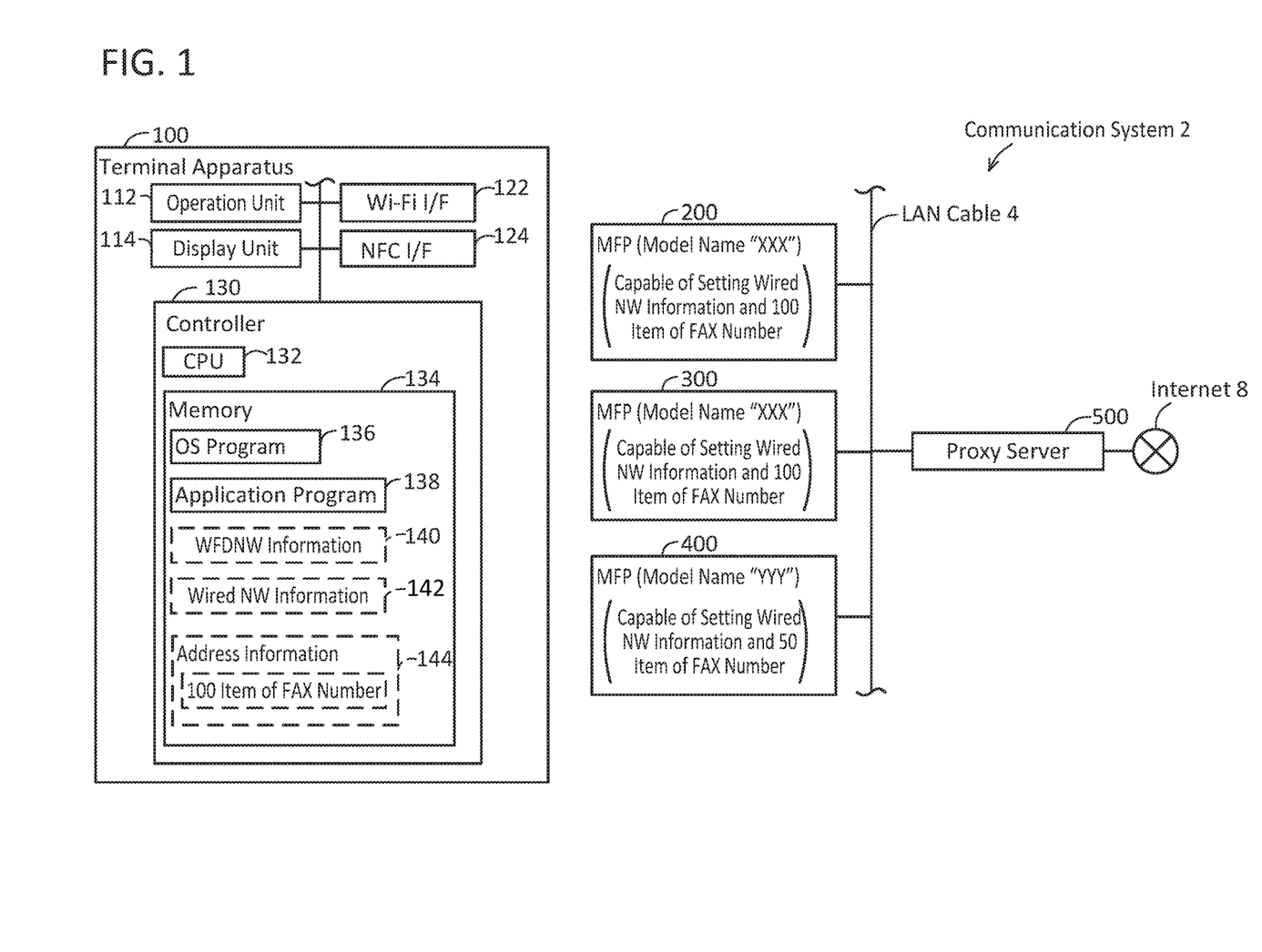
FIG. 1 shows a configuration of a communication system.

EMBODIMENT (First Embodiment)
(Configuration of Communication System 2; FIG. 1)
A communication system 2 comprises a terminal device 100, multi-function peripherals 200 to 400, and a proxy server 500. The multi-function peripherals 200 to 400 and the proxy server 500 are connected to a LAN (abbreviation of "Local Area Network") cable 4. The proxy server 500 is connected to the Internet 8. Below, the multi-function peripheral may be referred to as "MFP (abbreviation of Multi-Function Peripheral")".

(Configuration of Terminal Device 100)
The terminal device 100 is a portable device such as a mobile phone, a smart phone, or a note PC (abbreviation of "Personal Computer"), a tablet PC etc. The terminal device 100 comprises an operation unit 112, a display unit 114, a Wi-Fi interface 122, an NFC interface 124, and a controller 130. Each of the units 112 to 130 is connected to a bus wire (reference number omitted). Below, interface may be referred to as "I/F".

The operation unit 112 comprises a plurality of keys. A user can input various instructions to the terminal device 100 by operating the operation unit 112. The display unit 114 is a display for displaying various types of information. Moreover, the display unit 114 also functions as a so-called touch panel. That is, the display unit 114 also function as an operation unit operated by a user.

The Wi-Fi I/F 122 is an I/F for executing a wireless communication in accordance with a Wi-Fi scheme. The Wi-Fi scheme is a wireless communication scheme based on the standards developed by the Wi-Fi Alliance, e.g., IEEE (abbreviation of the "Institute of Electrical and Electronics Engineers, Inc".) standard 802.11 and standards conforming thereto (e.g., 802.11a, 11b, 11g, 11n, etc.). The Wi-Fi I/F 122, in particular, supports WFD (abbreviation of "Wi-Fi Direct" (registered trademark)) scheme developed by the Wi-Fi Alliance and is capable of executing wireless communication in accordance with the WFD scheme (called "WFD communication" below). The WFD scheme is a wireless communication scheme described in a standard "Wi-Fi Peer-to-Peer (P2P) Technical Specification Version1.1" formulated by the Wi-Fi Alliance. Further, details of the WFD scheme are also disclosed in US Patent Application Publication No. 2013/0260683, which is hereby incorporated herein by reference.

The NFC I/F 124 is an I/F for executing a wireless communication in accordance with an NFC scheme (called "NFC communication", below). The NFC I/F 124 is an NFC forum device capable of selectively operating in any of P2P (abbreviation of "Peer To Peer") mode, R/W (abbreviation of "Reader/Writer") mode, and CE (abbreviation of "Card Emulation") mode.

Here, differences between the Wi-Fi I/F 122 and the NFC I/F 124 will be described. A communication speed of the WFD communication via the I/F 122 (e.g., maximum communication speed is 11 to 600 Mbps) is faster than a communication speed of the NFC communication via the NFC I/F 124 (e.g., maximum communication speed is 100 to 424 Kbps). Further, a frequency of a carrier wave (e.g. a 2.4 GHz band or a 5.0 GHz band) used for the WFD communication via the Wi-Fi I/F 122 is different from a frequency of a carrier wave (e.g. a 13.56 MHz band) used for the NFC communication via the NFC I/F 124. Further, a maximum distance of the WFD communication that can be performed via the Wi-Fi I/F 122 (e.g., about 100 m at maximum) is greater than a maximum distance of the NFC communication that can be performed via the NFC I/F 124 (e.g., about 10 cm at maximum).

The controller 130 comprises a CPU 132 and a memory 134. The CPU 132 performs various processes in accordance with programs 136 and 138 stored in the memory 134. The memory 134 is configured by a volatile memory or non-volatile memory etc. The memory 134 stores an OS (abbreviation of "Operating System") program 136 for realizing basic processes, and an application program 138 (called "App", below).

The app 138 is a program provided by a vendor of each of the MFPs 200 to 400, and a program for sending setting information to each of the MFPs 200 to 400. The app 138 may be, for example, installed into the terminal device 100 from a server (not shown) on the Internet 8 provided by the vendor, or may be installed into the terminal device 100 from a medium shipped with each of the MFPs 200 to 400.

The memory 134 may further store WFD network information 140, wired network information 142, and address information 144. The WFD network information 140 is information relating to the WFD network for executing WFD communication, and including SSID (abbreviation of "Service Set Identifier") and a password. Below, network will be referred to as "NW". The WFDNW information 140 is stored in the memory 134 when an operation state of the terminal device 100 is shifted to a G/O (abbreviation of "Group Owner") state of the WFD scheme.

The wired NW information 142 and the address information 144 are information to be sent from the terminal device 100 to each of the MFPs as the setting information. The wired NW information 142 includes information (specifically, a user name, a password or the like) for authentication executed by the proxy server 500. The address information is an address list (i.e., so-called a telephone directory) including a plurality of (one hundred in the present embodiment) FAX numbers. It should be noted that, as described later, each of the information 142 and the information 144 is received from a sending device.

Each of the information 142 and the information 144 is stored in the memory 134 by the following operations and processes being executed. A user of the terminal device 100 gives to the terminal device 100, an app activation instruction for activating the app 138 and a receiving-mode shift instruction for shifting an operation mode of the app 138 into a receiving mode in this order by operating the operation unit 112. The receiving mode is a mode for receiving the setting information. The NFC I/F 124 operates in a state in which the P2P mode and the R/W mode are enabled, and the CE mode is disabled when the app 138 is set in the receiving mode. If the app activation instruction and the receiving-mode shift instruction are given, the CPU 132 causes the display unit 114 to display a screen promoting to bring the terminal device 100 close to the sending device (not shown), i.e., the source device that had sent the setting information. Further, the CPU 132, similarly to S12 of FIG. 2 described below, forms WFD network (called "WFDNW" below) in which the terminal device 100 operates as the G/O apparatus. The sending device is, for example, an MFP different from the MFPs 200 to 400, PC or the like, and is provided with an NFC I/F. The NFC I/F of the sending device may be an NFC forum device or an I/F called "NFC tag" functioning as an IC tag of the NFC scheme.

When a distance between the NFC I/F 124 and the NFC I/F of the sending device becomes less than a predetermined distance (e.g., 10 cm), the CPU 132 establishes a communication link via the NFC I/F 124 with the sending device. The CPU 132, similarly to S23 to S26 of FIG. 2 as described later, establishes a wireless connection in accordance with the WFD scheme (called "WFD connection" below) with the sending device. It should be noted that although in the present embodiment the terminal device 100 operates as the G/O apparatus and the sending device operates as a CL (abbreviation of "client") apparatus, in a modification the terminal device 100 may operate as the CL apparatus and the sending device may operate as the G/O apparatus. The CPU 132 receives the information 142 and 144 from the sending device via the Wi-Fi I/F 122, and stores the information 142 and 144 in the memory 134. Notably in a modification the CPU 132 may receive the information 142 and 144 from the server on the Internet (not shown), or the information 142 and 144 may be inputted by the user operating the operation unit 112.

(Configurations of MFPs 200 to 400)

Each of the MFPs 200 to 400 is a peripheral capable of executing multifunction including a print function, a scanner function, and a FAX function (i.e., peripheral such as a PC or the like, not shown). Each of the MFPs 200 to 400 includes a Wi-Fi I/F and an NFC I/F being an NFC tag (not shown). Each of the MFP 200 and the MFP 300 has a model name "XXX", and is capable of setting the wired NW information 142 and the address information 144 (i.e., one hundred FAX numbers). The MFP 400 has a model name "YYY", and is capable of setting the wired NW information 142. Since the MFP 400 is capable of setting only up to fifty FAX numbers, the MFP 400 is capable of setting only a part of the address information 144.

(Configuration of Proxy Server 500)

The proxy server 500 is installed on the LAN by an administrator of the LAN. The proxy server 500 is a server mediating communication between a device belonging to the LAN and the Internet 8. In order that the device belonging to the LAN executes communication with a device on the Internet 8, success of authentication by the proxy server 500 is required. The MFPs 200 to 400 communicate with the Internet 8 via the proxy server 500, and thereby the following advantageous effects are achieved. For example, if a specific device on the Internet 8 (not shown) is executing communication with any of the MFPs 200 to 400 via the proxy server 500, the specific device is not capable of identifying which of the MFPs 200 to 400 is executing communication with the specific device. Therefore, anonymity becomes higher viewed from the specific device side. Further, high speed communication becomes possible by the proxy server 500 caching information on the Internet 8 when each of the MFPs 200 to 400 executes the Internet communication. Further, the proxy server 500 becomes capable of monitoring the Internet communication of the MFPs 200 to 400 and capable of inducing a destination of the Internet communication of each of the MFPs 200 to 400 to a specific server.

Figure 2:
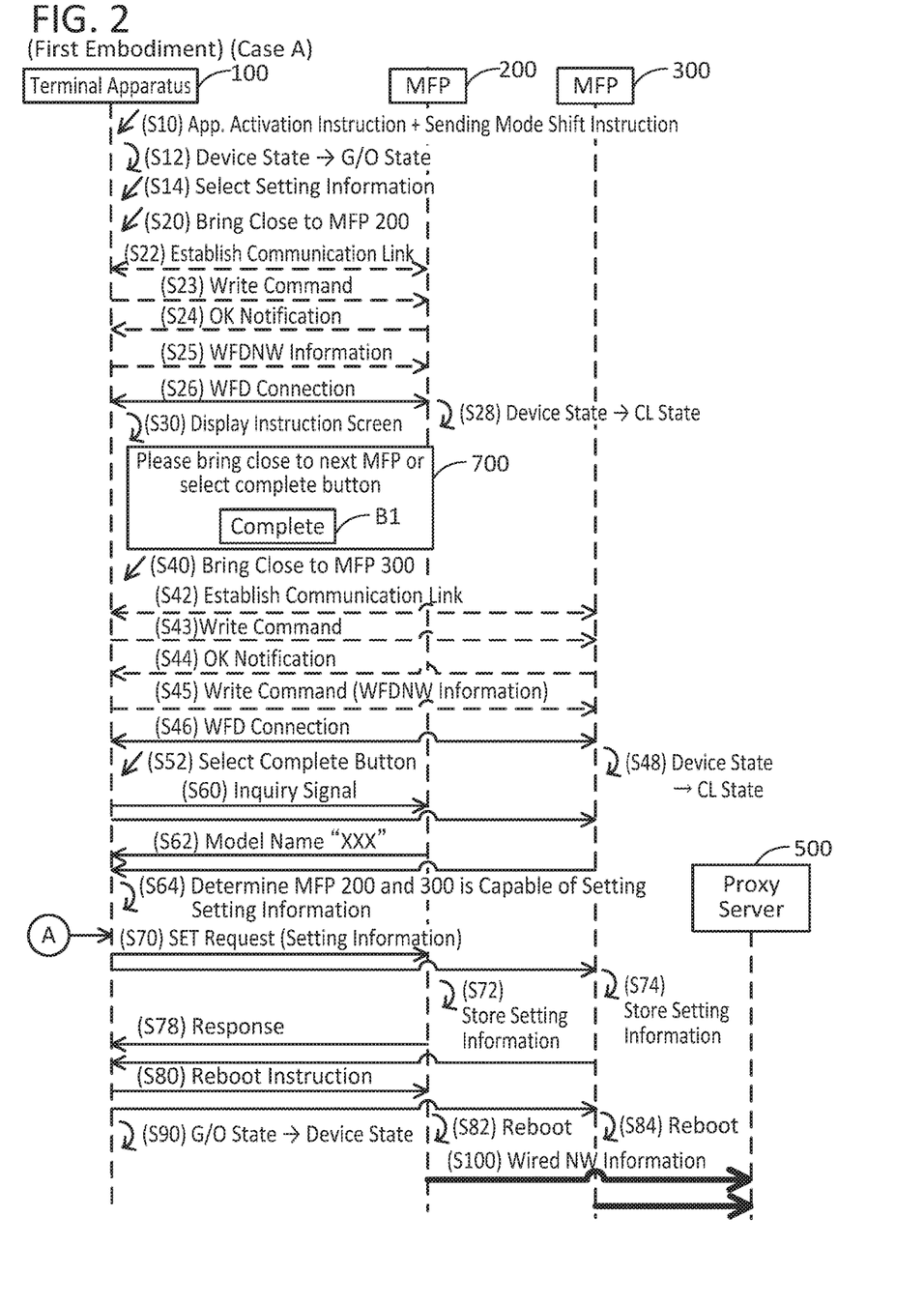
FIG. 2 shows a sequence diagram of case A where setting information is sent to two multi-function peripherals.

(Case A; FIG. 2)

Next, a specific case A of sending setting information to the MFPs 200 and 300 will be described with reference to FIG. 2. In an initial state of the case A, the information 142 and the information 144 have already been stored in the memory 134. In FIG. 2 each broken arrow between the terminal device 100 and the MFP 200 or the like indicates the NFC communication, and each solid arrow indicates the Wi-Fi communication, respectively. Further, each bold arrow between the MFP 200 and the proxy server 500 indicates a wired communication. The same applies to FIGS. 3 and 4 described later.

In S10, the user operates the operation unit 112 and gives the app activation instruction and a sending-mode shift instruction for shifting the operation mode of the app 138 into a sending mode to the terminal device 100 in this order. The sending mode is a mode for sending the setting information. When the app 138 is set in the sending mode, the NFC I/F 124 operates in a state in which the P2P mode and the R/W mode are enabled, and the CE mode is disabled. Each of the following processes executed by the CPU 132 is executed in accordance with the app 138.

In S12 the CPU 132 shifts the operation state of the terminal device 100 from a device state in which the terminal device 100 does not belong to the WFDNM to a G/O state in which the terminal device 100 is to operate as a G/O apparatus of the WFDNM, and the WFDNM to which only the terminal device 100 belongs is thereby formed. That is, here, the CPU 132 spontaneously shifts the operation state of the terminal device 100 into the G/O state so that the operation state of the terminal device 100 is prevented from being shifted to the CL state in which the terminal device 100 operates as the CL apparatus of the WFDNW. In S12, the CPU 132 further prepares an SSID and a password, and causes the WFDNW information 140 including those to be stored in the memory 134. Notably, the SSID and the password may be prepared by selecting random character strings or by obtaining predetermined character strings. Since the operation state of the terminal device 100 is shifted to the G/O state after each instruction in S10 has been given, the following advantageous effects are achieved compared to a configuration in which the operation state of the terminal device 100 has been shifted to the G/O state prior to S10. that is, since the G/O apparatus regularly sends a beacon signal in order to notify its presence to its surrounding apparatuses, the G/O apparatus has greater power consumption than a device apparatus. In the present embodiment, the power consumption can be reduced by delaying a timing when the operation state of the terminal device 100 is shifted to the G/O state.

In S14 the user operates the operation unit 112 and selects the wired NW information 142 and the address information 144 as the setting information to be sent. Notably, in a modification, only one of the information 142 and the information 144 may be selected as the setting information.

In S20 the user brings the terminal device 100 close to the MFP 200. When a distance between the NFC I/F 124 and the NFC I/F of the MFP 200 becomes less than a predetermined distance (e.g., 10 cm), in S22 a communication link is established with the MFP 200 via the NFC I/F 124. Since the NFC I/F of the MFP 200 is the NFC tag, the NFC I/F 124 operates in the R/W mode in the communication link established in S22.

In S23 the CPU 132 sends Write Command in accordance with the NFC scheme to the MFP 200 by using the communication link established in S22, and in S24 receives an OK notification to the Write Command from the MFP 200 by using the communication link. The Write Command is a signal for requesting to write information in a destination device. In response to receiving the OK notification in S24, in S25 the CPU 132 sends the WFDNW information 140 to the MFP 200 by using the communication link. Specifically, the CPU 132 writes the WFDNW information 140 in the NFC tag of the MFP 200 in accordance with a Writer mode.

In S26 the CPU 132 executes communication of various signals (specifically Probe signal, Authentication signal, Association signal, 4-way handshake etc.) via the Wi-Fi I/F 122 to establish the WFD connection with the MFP 200. The CPU 132 receives the WFDNW information 140 from the MFP 200 in the process of the above-described communication of various signals, and executes authentication of the WFDNW information 140. If the authentication of the WFDNW information 140 succeeds, the CPU 132 causes the MFP 200 to join the WFDNW as a CL apparatus. Notably, in a modification, the MFP 200 may join the WFDNW as a legacy apparatus without executing operations in accordance with the WFD scheme.

In S28 the MFP 200 shifts the operation state of the MFP 200 from the device state in which the MFP 200 does not belong to the WFDNW to the CL state in which the MFP 200 operates as the CL apparatus in the process of establishing the WFD connection in S26.

In S30 the terminal device 100 causes the display unit 114 to display an instruction screen 700. The instruction screen 700 includes an instruction message and a complete button B1. The instruction message is a message for causing the user to select either of bringing the terminal device 100 close to another MFP or pressing the complete button B1.

In S40 the user brings the terminal device 100 close to the MFP 300 in accordance with the instruction screen 700. Processings in S42 to S48 are the same as those in S22 to S28 respectively except for the MFP 300 instead of the MFP 200 being a target of the processes. The processes in S42 to S48 are executed while the operation state of the terminal device 100 is maintained in the G/O state after the operation state of the terminal device 100 has been shifted to the G/O state in S12 without being shifted to the other state (i.e., the device state or the CL state). When S48 ends, each of the two MFPs 200 and 300 joins, as the CL apparatus, the WFDNW in which the terminal device 100 operates as the G/O apparatus.

In S52 the user selects the complete button B1 in the instruction screen 700. Due to this, selection of the MFPs 200 or 300 as a destination to which the setting information in S14 is to be sent from the terminal device 100 is thereby completed.

In S60, the CPU 132 broadcasts an inquiry signal to the WFDNW via the Wi-Fi I/F 122 in response to the selection of the complete button B1 in S52. The inquiry signal is a signal for inquiring a model name of the MFP. In S62 the CPU 132 receives the model name of MFP "XXX" from each of the MFPs 200 and 300 by using the WFDNW via the Wi-Fi I/F 122.

In S64, the CPU 132 determines whether or not each of the MFPs 200 and 300 is a device capable of setting the setting information of S14. Here, the app 138 stores in advance the name of the model (i.e., model name) and information capable of being set in the model (e.g., maximum number of FAX numbers capable of being set) in an associated manner with respect to each of the plurality of the MFPs (the information not shown). The CPU 132 specifies information capable of being set in each of the MFPs 200 and 300 based on the stored information and the model name "XXX" received in S62. The CPU 132 determines whether or not the setting information of S14 is included within the specified information with respect to each of the MFPs 200 and 300. In the present case the CPU 132 determines that the setting information of S14 is included within the specified information with respect to each of the MFPs 200 and 300, and thus determines each of MFPs 200 and 300 is a device capable of setting the setting information in S14.

In S70, the CPU 132 broadcasts a SET request including the setting information of S14 to the WFDNW via the Wi-Fi I/F 122. The SET request is a signal in accordance with SNMP (abbreviation of "Simple Network Management Protocol"), and a signal for requesting setting of the setting information. Due to this, the CPU 132 is capable of sending the setting information (i.e., the wired NW information 142 and the address information 144) to each of the MFPs 200 and 300. Further, since the CPU 132 broadcasts the SET request to the WFDNW, the following advantageous effects are achieved compared with a configuration that each of the MFPs 200 and 300 is individually specified as a destination and the SET request is unicasted. Firstly, in the present embodiment, an address of a destination is not required to be specified. Further, according to the above-described configuration the CPU 132 needs to send the SET request twice while in the present embodiment the CPU 132 needs to send the SET request only once, which can reduce the processing load. It should be noted that generally in a case where information is broadcasted to a NW there is a risk that the information might be sent to a device unexpected by the user. However, in the present embodiment, since the MFPs 200 and 300, which belong to the WFDNW, are devices selected by the user, the SET request broadcasted will never be sent to an unexpected device.

When the SET request is received from the terminal device 100, in S72 and S74, each of the MFPs 200 and 300 stores (i.e., sets) the setting information included in the SET request.

In S78, the CPU 132 receives a response to the SET request from each of the MFPs 200 and 300 via the Wi-Fi I/F 122 by using the WFDNW. The response is a signal indicating that the setting information has been stored in the MFP, which is the sender of the response.

In S80, the CPU 132 broadcasts a reboot instruction to the WFDNW via the Wi-Fi I/F 122. The reboot instruction is an instruction for causing the MFP, a destination of the instruction, to reboot (i.e., to turn the power OFF, and then ON).

When the reboot instruction is received from the terminal device 100, each of the MFPs 200 and 300 reboots in S82 and S83. Due to this, each of the MFPs 200 and 300 can execute processes by using all of the stored setting information. Further, the operation state of the MFP 200 is shifted from the CL state to the device state, and the WFDNW information written in the NFC I/F of the MFP 200 is erased.

In S90, the CPU 132 shifts the operation state of the terminal device 100 from the G/O state to the device state. Due to this, for example, in a situation where the WFD connection is to be established with other apparatus operating as a G/O apparatus after the processes in FIG. 2, the CPU 132 can establish the WFD connection with the other apparatus. For example, the CPU 132 spontaneously shifts the operation state of the terminal device 100 to the G/O state again and can establish the WFD connection with the other device if the instruction in S10 is given again. Alternatively, for example, the CPU 132 can execute a G/O negotiation with the other apparatus in accordance with the WFD scheme without being given the instruction of S10, and the operation state of the terminal device 100 can be shifted to the G/O state or the CL state selectively, and the WFD connection can be established with the other apparatus.

In S100, each of the MFPs 200 and 300 sends the wired NM information 142 stored (i.e., set) in S72 and S74 to the proxy server 500 via the LAN cable 4. When receiving the wired NM information 142 from each of the MFPs 200 and 300, the proxy server 500 executes authentication of the MFP by using the wired NM information 142. The MFPs 200 and 300 can execute the Internet communication via the proxy server 500 when their authentication succeeds. Notably, in this case, a situation where each of the MFPs 200 and 300 belongs to the LAN in advance is assumed. However, in a modification, for example, a user may connect each of the MFPs 200 and 300 to the LAN cable 4 after each of the MFPs 200 and 300 has rebooted, and thereby each of the MFPs 200 and 300 may belong to the LAN. More specifically, in this modification, firstly the user takes each of the MFPs 200 and 300 out from a packaging container, and the power of the MFP 200 and 300 is turned on. Next, the processes and the operations in S10 to S90 are executed. Each of the MFPs 200 and 300 executes the process in S100 after having been connected to the LAN cable 4 by the user.

(Advantageous Effect of Case A)

The following configuration of a first comparative example will be assumed. That is, upon when the communication link is established in accordance the NFC scheme by bringing the terminal device close to the MFP 200, the terminal device of the first comparative example spontaneously shifts the operation state of the terminal device from the device state to the G/O state, and forms the WFDNW. Then the terminal device establishes the WFD connection with the MFP 200, and sends a SET request including setting information to the MFP 200. After that, the terminal device shifts the operation state of the terminal device from the G/O state to the device state. Next, upon when the communication link is established in accordance the NFC scheme due to the terminal device 100 being brought close to the MFP 300, the terminal device 100 spontaneously shifts the operation state of the terminal device 100 from the device state to the G/O state, and forms the WFDNW. Then, the terminal device establishes the WFD connection with the MFP 300, and sends a SET request including the setting information to the MFP 300. In the first comparative example, the terminal device executes shifting of the operation state from the device state to the G/O state, the G/O state to the device state, and again from the device state to the G/O state, in order to send the setting information to each of the MFPs 200 and 300.

In the present embodiment, the terminal device 100 causes the MFPs 200 and 300 to join the above-described WFDNW (S26, S46) without being shifted to another state (i.e., CL state or device state) after having been shifted to the G/O state for operating as the G/O apparatus of the WFDNW. Then the terminal device 100 sends the SET request including the setting information to the MFPs 200 and 300 by using the above-described WFDNW (S70). Thus, the terminal device 100 is required to execute only the shift of the operation state from the device state to the G/O state in order to send the setting information to each of the MFPs 200 and 300 (S129). That is, since a number of times that the operation state of the terminal device 100 is shifted can be reduced in the situation where the setting information is to be sent to each of the MFPs 200 and 300, processing load of the terminal device 100 can be alleviated.

Further, in the first comparative example, the terminal device sends the SET request to the MFP 200 by a predetermined operation being executed by the user after the WFD connection with the MFP 200 is established. Then the predetermined operation needs to be executed again by the user after the WFD connection with the MFP 300 has been established in order to send the SET request to the MFP 300. On the other hand, in the present embodiment, since the WFDNW in which the terminal device 100 operates as the G/O apparatus is formed, the plurality of MFPs 200 and 300, to which the SET request is to be sent, and the terminal device 100 can belong to one WFDNW. Due to this, the terminal device 100 can send the SET request to the MFPs 200 and 300 by only one operation being executed after the WFDNW has been formed (S52). Accordingly, operation load of the user can be alleviated A configuration of a second comparative example will be assumed in the following. That is, in the second comparative example, a communication link in accordance with the NFC scheme is established by bringing the terminal device close to the MFP 200, and then the terminal device establishes the WFDNW connection with the MFP 200 that is to operate as a G/O apparatus of the WFDNW, and the terminal device is shifted to the CL state. The terminal device is shifted from the CL state into the device state after the SET request including the setting information has been sent to the MFP 200. Next, a communication link in accordance with the NFC scheme is established by bringing the terminal device close to the MFP 300, then the terminal device establishes the WFDNW connection with the MFP 300 that is to operate as the G/O apparatus of the WFDNW, and the terminal device is shifted to the CL state. Then the terminal device sends the SET request to the MFP 300. It should be noted that since the terminal device is incapable of establishing the WFD connection with the plurality of MFPs 200 and 300 simultaneously in a state of operating as the CL apparatus, the terminal device needs to be shifted to the device state after sending the SET request to the MFP 200.

In the present embodiment, since the terminal device 100 operates as the G/O apparatus of the WFD, the terminal device is capable of establishing the WFD connection with the plurality of MFPs 200 and 300 simultaneously. That is, the terminal device 100 can establish the WFD connection with the MFP 300 and send the SET request to the MFP 300 without disconnecting the WFD connection with the MFP 200. Due to this, the terminal device 100 can efficiently execute the establishment of the WFD connection and sending of the setting information.

Figure 3:
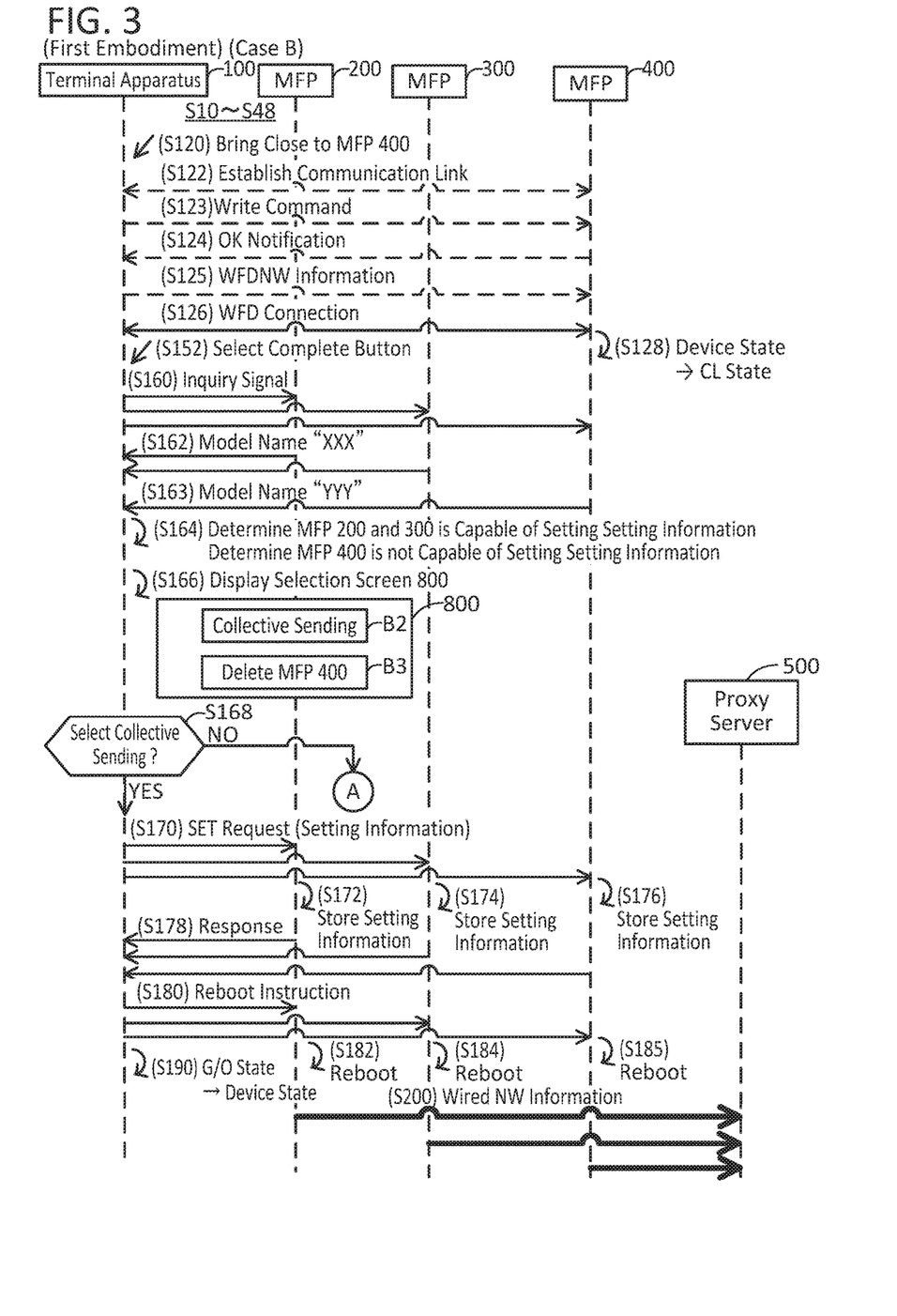
FIG. 3 shows a sequence diagram of case B where setting information is sent to three multi-function peripherals.

(Case B; FIG. 3)

Next, Case B, in which the setting information is sent to each of the MFPs 200 to 400, will be explained with reference to FIG. 3. An initial state of the present embodiment is the same as the initial state of Case A. Firstly, the same operations and processes as those of S10 to S48 of FIG. 2 are executed. Due to this, each of the two MFPs 200 and 300 joins, as a CL apparatus, the WFDNW in which the terminal device 100 operates as a G/O apparatus.

In S120, a user brings the terminal device 100 close to the MFP 400 in accordance with the instruction screen 700 displayed in S30. The processes of S122 to S128 are the same as those of S22 to S28 of FIG. 2 except for the MFP 400 being a target of processes instead of the MFP 200. When S128 ends, each of the three MFPs 200 to 400 joins, as the CL apparatus, the WFDNW in which the terminal device 100 operates as the G/O apparatus.

The processes of S152 to S162 are the same as those of S52 to S62 of FIG. 2. In S163 the CPU 132 receives a model name of the MFP 400 "YYY" from the MFP 400 via the Wi-Fi I/F 122 by using the WFDNW.

In S164 the CPU 132 determines whether or not each of the MFPs 200 to 400 is a device capable of setting the setting information of S14. The CPU 132 specifies information that can be set in each of the MFPs 200 to 400 based on the information already stored in the app 138 and the model names "XXX" and "YYY" received in S162 and S163. The CPU 132 determines whether or not the setting information in S14 is included within the specified information with respect to each of the MFPs 200 to 400. The CPU 132 determines that the setting information in S14 is included within the specified information with respect to each of the MFPs 200 and 300, and determines that each of the MFPs 200 and 300 is a device capable of setting the setting information. The CPU 132 determines that the setting information in S14 is not included within the specified information with respect to the MFP 400, and determines that the MFP 400 is a device incapable of setting at least part of the setting information in S14.

In S166, in response to determining that the MFP 400 is the device incapable of setting at least part of the setting information in S14, the CPU 132 causes a selection screen 800 to de displayed in the display unit 114. The selection screen 800 includes a collective sending button B2 and a delete button B3. The collective sending button B2 is a button for sending the setting information to all of the MFPs belonging to the WFDNW (i.e., 200 to 400). The delete button B3 is a button for deleting the MFP 400 from sending destination of the setting information, since the MFP 400 is a device incapable of setting at least part of the setting information. The user can recognize that the MFP 400 is incapable of setting at least part of the setting information by seeing the delete button B3.

In S168 the CPU 132 determines whether or not the collective sending button B2 has been selected by the user in the selection screen 800. The CPU 132 proceeds to S170 in a case where the collective sending button B2 has been selected (YES in S168). On the other hand, the CPU 132 proceeds to S70 of FIG. 2 in a case where the delete button B3 has been selected (NO in S168). It should be noted that in the case where determination of NO has been made in S168, the CPU 132 does not broadcasts the signals in S70 and S80, but multicasts to the MFPs 200 and 300. The CPU 132 does not send the setting information to the MFP 400. This can prevents the setting information from being sent to the MFP 400, which is incapable of setting at least part of the setting information.

In S170, the CPU 132 broadcasts the SET request including the setting information to the WFDNW via the Wi-Fi I/F 122. The processes of S172 and S174 are the same as those of S72 and S74 of FIG. 2 respectively. In S176, the MFP 400 stores the setting information included in the SET request. In S178 the CPU 132 receives a response to the SET request from each of the MFPs 200 to 400 via the Wi-Fi I/F 122. In S180 the CPU 132 broadcasts a reboot instruction to the WFDNW via the Wi-Fi I/F 122.

The processes of S182 and S184 are the same as those of S82 and S84 of FIG. 2 respectively. Due to this, the MFPs 200 and 300 can set all of the stored setting information. However, in S185 the MFP 400 can set only a part of the stored setting information even if it is rebooted. Specifically, the MFP 400 can set the wired NM information 142, but can set only fifty FAX numbers out of the one hundred FAX numbers in the address information 144.

The process of S190 is the same as that of S90 of FIG. 2. In S200 each of the MFPs 200 to 400 sends the wired NW information 142 stored (i.e., set) in S172 to S176 via the LAN cable 4 to the proxy server 500. When the proxy server 500 receives the wired NW information 142 from each of the MFPs 200 to 400, the proxy server 500 executes authentication of the MFP by using the wired NW information 142. The MFPs 200 to 400 can execute the Internet communication via the proxy server 500 when their authentication succeeds. Also in the present case, similarly to Case A of FIG. 2, the processing load of the terminal device 100 can be alleviated because a number of times that the operation state of the terminal device 100 is shifted can be reduced in a situation where the setting information is to be sent to each of the MFPs 200 to 400 (YES in S168).

(Second Embodiment)

Second embodiment is different from the first embodiment in that the setting information is unicasted. A specific case of the present embodiment will be explained with reference to FIG. 4. First, the same operations and the processes as those in S10 to S28 are executed.

Figure 4:
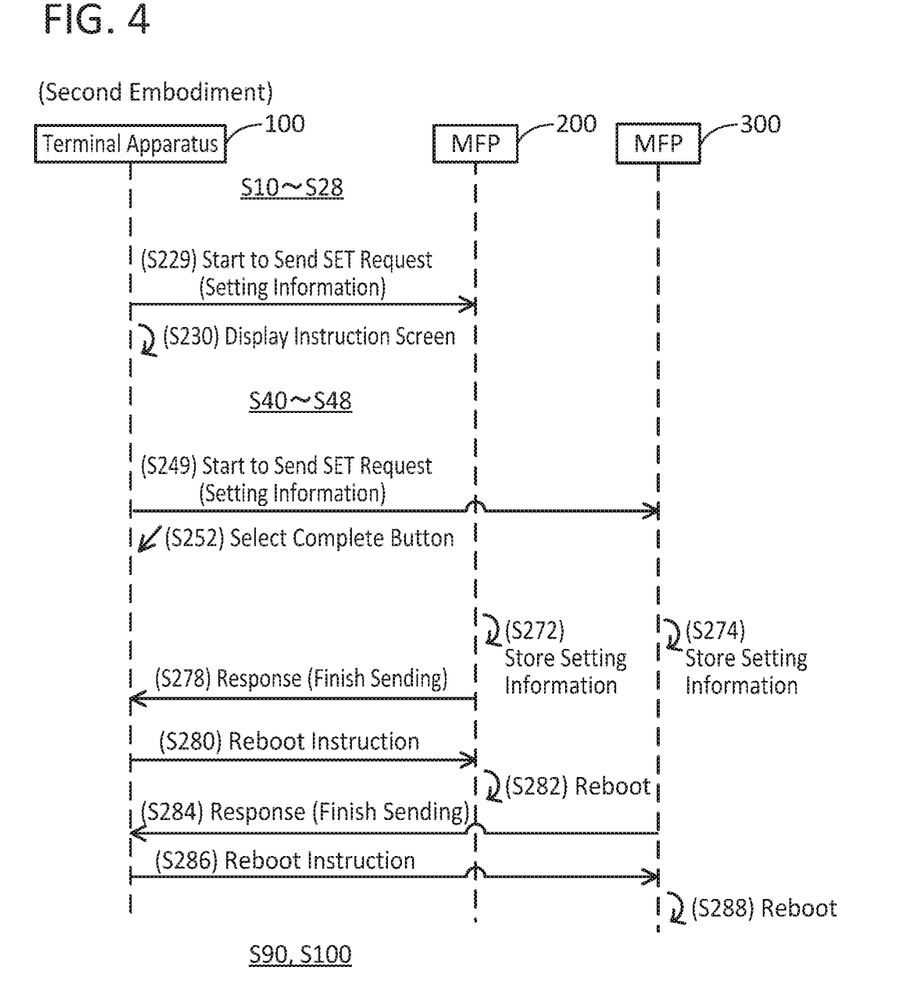
FIG. 4 shows a sequence diagram of Second Embodiment.

In S229 the CPU 132 starts to unicasts the setting information to the MFP 200 via the Wi-Fi I/F 122 by using the WFDNW.

The process of S230 is the same as that of S30 of FIG. 2. Then the same operations and the processes as those in S40 to S48 are executed. In S249 the CPU 132 starts to unicast the setting information to the MFP 300 via the Wi-Fi I/F 122 by using the WFDNW.

The processes of S252, S272, and S274 are the same as those of S52, S72, and S74 of FIG. 2 respectively. In S278 the CPU 132 receives a response to the SET request from the MFP 200 via the Wi-Fi I/F 122 by using the WFDNW. That is, the CPU 132 establishes the WFD connection with the MFP 300, and causes the MFP 300 to join, as a CL apparatus, the WFDNW (S46, S48) during a time from when the unicast transmission to the MFP 200 is started (S229) until when the unicast transmission is finished (S278). In S280 the CPU 132 unicasts a reboot instruction to the MFP 200 via the Wi-Fi I/F 122. The process of S282 is the same as that of S82.

In S284 the CPU 132 receives a response to the SET request from the MFP 300 via the Wi-Fi I/F 122 by using the WFDNW. In S286 the CPU 132 unicasts a reboot instruction to the MFP 300 via the Wi-Fi I/F 122. The process of S288 is the same as that of S84 of FIG. 2. Then the same processes as those in S90 and S100 of FIG. 2 are executed.

(Advantageous Effect of Second Embodiment)

Also in the present embodiment, similarly to Case A of FIG. 2, the processing load of the terminal device 100 can be alleviated because a number of times that the operation state of the terminal device 100 is shifted can be reduced in the situation where the setting information is to be sent to each of the MFPs 200 and 300 respectively. Further, unlike Case A, in the present embodiment, user convenience can be improved since the complete button B1 is not required to be selected (S52 of FIG. 2) before the setting information is sent. Further, in the present embodiment, the terminal device 100 sends the reboot instruction to the MFP 200 (S280) in response to receiving the response from the MFP 200 (S278). Due to this, the terminal device 100 can efficiently disconnect the WFD connection with an MFP to which the SET request has been sent. That is, the terminal device 100 can suppress an increase in a number of CL apparatuses belonging to the WFDNW. Due to this, for example, the number of CL apparatuses belonging to the WFDNW can be suppressed from exceeding its upper limit value in a case where the setting information is to be sent to multiple MFPs.

In the above-described second comparative example, the terminal device cannot establish the WFD connection with the MFP 300 to send the SET request to the MFP 300 before sending of the SET request to the MFP 200 is completed. On the other hand, in the present embodiment the terminal device 100 establishes connection with the MFP 300 (S46) and starts the transmission of the SET request to the MFP 300 (S249) during a time from when the unicast transmission to the MFP 200 is started until when the unicast transmission is finished. Due to this, the terminal device 100 can efficiently execute establishment of the WFD connection and sending of the setting information.

(Corresponding Relationship)

Each of the MFPs 200 to 400 is an example of "a first communication device". Each of the MFPs 200 to 400 is an example of "a second communication device". The G/O state and the device state are examples of "parent state" and "non-parent state" respectively. The G/O apparatus and the CL apparatus are examples of "parent station" and "child station" respectively. The WFDNW and the WFD connection are examples of "wireless network" and "wireless connection" respectively. The sending mode shift instruction is an example of "trigger instruction" and "an instruction for selecting a mode for sending the predetermined setting information after activating the computer-readable instructions". The Wi-Fi I/F 122 and the NFC I/F 124 are examples of "first wireless interface" and "second wireless interface" respectively. The wired NW information 142 and the address information 144 are examples of "predetermined setting information".

(Modification 1)

The Wi-Fi I/F 122 may support a so-called Soft AP instead of the WFD scheme. In this case, the CPU 132 may activate the SoftAP, for example, in S12 of FIG. 2, and may form a wireless NW in which the terminal device 100 operates as a parent station, and in S26 and S46, the CPU 132 may establish a wireless connection in accordance with the SoftAP with each of the MFPs 200 and 300. That is, the "parent station" may be a SoftAP.

(Modification 2)

In each of the above-described embodiments, the operation state of the terminal device 100 is spontaneously shifted to the G/O state (S12 of FIG. 2 etc.). However, in a modification the terminal device may be shifted to the G/O state by G/O negotiation being executed between the terminal device 100 and the MFP. In the present modification, for example, S12, and S23 to S25 may be omitted, and the terminal device 100 may execute G/O negotiation with the MFP 200 via the Wi-Fi I/F 122 upon when the communication link in accordance with NFC scheme is established with the MFP 200. At this point, the terminal device 100 notifies the MFP 200 of maximum value (i.e., 15) as an intent value of the terminal device (i.e., a value indicating likeliness of being a G/O apparatus). As a result, the operation state of the terminal device 100 is shifted to the G/O state, and the operation state of the MFP 200 is shifted to the CL state. The terminal device 100 sends the WFDNW information 140 to the MFP 200 in the process of establishing the WFD connection with the terminal device 100. It should be noted that in a case where a configuration is adopted in which the WFDNW information 140 has been stored in advance in the terminal device 100 and the MFP 200, the terminal device 100 may not send the WFDNW information 140 to the MFP 200. In the present modification, "send the network information to the first communication device" and "send the network information to the second communication device" may be omitted. Further, establishing a communication link in accordance with the NFC scheme corresponds to "a predetermined trigger instruction".

(Modification 3)

"A second wireless interface" is not limited to the NFC I/F 124, but, for example, may be an I/F in accordance with Bluetooth scheme or an I/F in accordance with TransferJet (registered trademark) scheme.

(Modification 4)

The NFC I/F included in each of the MFPs 200 to 400 may be an NFC forum device. In this case, the terminal device 100 sends the WFDNW information to each of the MFPs 200 to 400 (S25 of FIG. 2 etc.) in accordance with the P2P mode. In this case, the terminal device 100 may not send the Write Command (S23 etc.). That is, the Write Command may not be sent to at least one of the first communication device and the second communication device.

(Modification 5)

In each of the above-described embodiments, the operation state of the terminal device 100 is shifted to the G/O state by being given the sending mode shift instruction as a trigger (S12 of FIG. 2 etc.). However, in a modification, the operation state of the terminal device 100 may be shifted to the G/O state by being given the instruction of activating an app as a trigger. That is, "a predetermined trigger instruction" may be an instruction for activating computer program.

(Modification 6)

In each of the above-described embodiments, the terminal device 100 sends the SET request including the setting information to the MFP in accordance with SNMP (S70 of FIG. 2 etc.). However, in a modification, the terminal device 100 may send the setting information, for example, in accordance with HTTP (abbreviation of "Hypertext Transfer Protocol"), or may send in accordance with PJL (abbreviation of "Printer Job Language"). It should be noted that in a case where the PJL is adopted an amount of information which can be set by sending one packet can be increased compared to that in a case where the SNMP is adopted.

(Modification 7)

The terminal device 100 may not send the reboot instruction (S80 of FIG. 2 etc.). In this case, for example, the user may reboot each of the MFPs 200 and 300 by turning their power OFF. Further, the reboot instruction may not be sent, for example, in a case where the setting information is information that can be used without rebooting each of the MFPs 200 and 300. That is, at least one of "send a reactivation instruction to the first communication device" and "send a reactivation instruction to the second communication device" may be omitted.

(Modification 8)

The terminal device 100 may not shift the operation state of the terminal device 100 from the G/O state to the device state after sending the setting information (see S90 of FIG. 2 etc.). That is, "shift of the operation state of the terminal device" may be omitted.

(Modification 9)

The terminal device 100 may not send the inquiry signal (S160 of FIG. 3 etc.) and may not receive the model name of the MFP (S162, S163 etc.). Further, the terminal device 100 may broadcast the SET request including the setting information (S170) without causing the display unit to display the selection screen 800. That is, at least one of "receive model information" and "cause a display unit of the terminal device to display apparatus information" may be omitted.

(Modification 10)

In each of the above-described embodiments the setting information includes information 142 and 144, and in a modification the setting information may further include print setting information relating to a print function executed by the MFP, scan setting information relating to a scan function executed by the MFP, function limit setting information for limiting functions executed by the MFP, and firmware information being firmware to be installed in the MFP. Generally speaking, "predetermined setting information" may include at least one of the information. Notably, the print setting information may be, for example, default print setting (size of print media etc.). The scan setting information may be, for example, default scan setting (resolution etc.). The function limit setting information is information associating identification information for identifying each user and functions the user is allowed to use with respect to each user. When a login is executed by using identification information of a user, the MFP is able to execute a function associated with the identification information (e.g., print function), but is not able to execute a function that is not associated with the identification information (e.g., scan function). In this case, the MFP limits the scan function from being executed by the user. The MFP becomes able to limit functions for each user by receiving and storing the function limit setting information. The above-described firmware information may not be the firmware itself, but may be, for example, a URL (abbreviation of "Uniform Resource Locator") indicating a location of the firmware on the Internet. Notably, in a case where the setting information does not include the wired NW information 142 relating to the Internet 8, each of the MFPs 200 and 300 may not be connected with the LAN cable 4, and S100 of FIG. 2 may be omitted.

(Modification 11)

The setting information may include the wireless NW information relating to the wireless NW instead of the wired NW information 142. The wireless NW is a NW formed by an access point. The wireless NW information includes an SSID and a password for joining the wireless NW. In a modification the terminal device 100 can cause the MFP to belong to the wireless NW by causing the MFP to set the wireless NW information.

(Modification 12)

In each of the above embodiments, each process of FIG. 2 to FIG. 4 is implemented by software (i.e., computer-readable instructions). Alternatively, at least one of the processes may be implemented by hardware such as a logic circuit, etc.

What is claimed is:

1. A non-transitory computer-readable storage medium storing a computer program including computer-readable instructions for a terminal device,
wherein when the computer-readable instructions are executed by a processor of the terminal device, the terminal device performs functions of:

shifting an operating state of the terminal device from a non-parent station state to a parent station state for forming a wireless network if a predetermined trigger instruction is given, the non-parent station state being a state in which the terminal device does not operate as a parent station of the wireless network, the parent station state being a state in which the terminal device operates as the parent station of the wireless network, and the wireless network being for executing a wireless communication via a first wireless interface of the terminal device;

establishing a wireless connection with a first communication device via the first wireless interface so as to form the wireless network to which the terminal device and the first communication device belong by causing the first communication device to join the wireless network in which the terminal device operates as the parent station, in a case where a first communication link via a second wireless interface of the terminal device is established with the first communication device after the operating state of the terminal device has been shifted from the non-parent station state to the parent station state, the second wireless interface being different from the first wireless interface;

sending predetermined setting information to the first communication device via the first wireless interface by using the wireless network to which the terminal device and the first communication device belong, in a case where the wireless connection is established with the first communication device;

establishing a wireless connection with a second communication device via the first wireless interface so as to form the wireless network to which the terminal device, the first communication device, and the second communication device belong by causing the second communication device to join the wireless network in which the terminal device maintains to operate as the parent station, in a case where a second communication link via the second wireless interface is established with the second communication device while the wireless network to which the terminal device and the first communication device belong is formed and the operating state of the terminal device is maintained as the parent station state, without being shifted to the non-parent station state, after having been shifted to the parent station state after the wireless connection has been established with the first communication device, the second communication device being different from the first communication device, the second communication link being different from the first communication link; and sending the predetermined setting information that is sent to the first communication device to the second communication device via the first wireless interface by using the wireless network to which the terminal device, the first communication device, and the second communication device belong, in a case where the wireless connection is established with the second communication device.

2. The non-transitory computer-readable storage medium as in claim 1, wherein
the operating state of the terminal device is shifted from the non-parent station state to the parent station state so as to form the wireless network to which the terminal device belongs and to which the first communication device and the second communication device do not belong, if the predetermined trigger instruction is given before the first communication link is established with the first communication device, wherein when the computer-readable instructions are executed by the processor of the terminal device, the terminal device further performs functions of:

sending network information which is related to the wireless network to the first communication device via the second wireless interface by using the first communication link, in a case where the first communication link is established with the first communication device after the wireless network to which the terminal device belongs and to which the first communication device and the second communication device do not belong has been formed; and sending the network information to the second communication device via the second wireless interface by using the second communication link, in a case where the second communication link is established with the second communication device after the wireless network to which the terminal device belongs and to which the first communication device and the second communication device do not belong has been formed, wherein the wireless connection with the first communication device is established via the first wireless interface by using the network information, and wherein the wireless connection with the second communication device is established via the first wireless interface by using the network information.

3. The non-transitory computer-readable storage medium as in claim 2, wherein:

the second wireless interface is for executing a wireless communication in accordance with an NFC (abbreviation of Near Field Communication) scheme, the network information is sent to the first communication device in response to sending a Write Command according to the NFC scheme to the first communication device, and the network information is sent to the second communication device in response to sending the Write Command to the second communication device.

4. The non-transitory computer-readable storage medium as in claim 1, wherein the predetermined trigger instruction includes one of:
an instruction for activating the computer program; and
an instruction for selecting a mode for sending the predetermined setting information after activating the computer program.

5. The non-transitory computer-readable storage medium as in claim 1, wherein the predetermined setting information is sent to each of the first communication device and the second communication device by executing, in a state where both the first communication device and the second communication device belong to the wireless network, a broadcast transmission of the predetermined setting information via the first wireless interface to the wireless network.

6. The non-transitory computer-readable storage medium as in claim 1, wherein:

the predetermined setting information is sent to the first communication device by executing a unicast transmission via the first wireless interface by using the wireless network, the wireless connection with the second communication device is established so as to cause the second communication device to join the wireless network in a period from a timing at which the unicast transmission to the first communication device is started to a timing at which the unicast transmission is finished, and the predetermined setting information is sent to the second communication device by executing a unicast transmission via the first wireless interface by using the wireless network.

7. The non-transitory computer-readable storage medium as in claim 1, wherein:

the predetermined setting information is sent to the first communication device by sending a SET request according to an SNMP (abbreviation of Simple Network Management Protocol) including the predetermined setting information to the first communication device, and the predetermined setting information is sent to the second communication device by sending the SET request including the predetermined setting information to the second communication device.

8. The non-transitory computer-readable storage medium as in claim 1, wherein when the computer-readable instructions are executed by the processor of the terminal device, the terminal device further performs functions of:

sending a reboot instruction for rebooting the first communication device to the first communication device via the first wireless interface by using the wireless network after the predetermined setting information has been sent to the first communication device; and sending a reboot instruction for rebooting the second communication device to the second communication device via the first wireless interface by using the wireless network after the predetermined setting information has been sent to the second communication device.

9. The non-transitory computer-readable storage medium as in claim 1, wherein when the computer-readable instructions are executed by the processor of the terminal device, the terminal device further performs functions of:

shifting the operating state of the terminal device from the parent station state to the non-parent station state after the predetermined setting information has been sent to both the first communication device and the second communication device.

10. The non-transitory computer-readable storage medium as in claim 1, wherein when the computer-readable instructions are executed by the processor of the terminal device, the terminal device further performs functions of:

receiving, from each of the first communication device and the second communication device, model information indicating a model of the respective communication device via the first wireless interface by using the wireless network; and causing a display unit of the terminal device to display, in a case where the model information received from at least one of the first and second communication devices indicates a model which is not capable of setting at least a part of the predetermined setting information, device information indicating the at least one of the first and second communication devices.

11. The non-transitory computer-readable storage medium as in claim 1, wherein when the computer-readable instructions are executed by the processor of the terminal device, the terminal device further performs the functions of:

receiving, from each of the first communication device and the second communication device, device model information indicating a model of the respective communication device via the first wireless interface by using the wireless network, wherein the predetermined setting information is not sent to the first communication device in a case where the model information received from the first communication device indicates a model which is not capable of setting at least a part of the predetermined setting information, and wherein the predetermined setting information is not sent to the second communication device in a case where the model information received from the second communication device indicates a model which is not capable of setting at least a part of the predetermined setting information.

12. The non-transitory computer-readable storage medium as in claim 1, wherein the predetermined setting information includes at least one of:

network setting information which is related to a predetermined network to which the first communication device and the second communication device are to belong;

address setting information indicating an address list which is to be registered in the first communication device and the second communication device;

print setting information which is related to a print function executed by the first communication device and the second communication device;

scan setting information which is related to a scan function executed by the first communication device and the second communication device;

function limitation setting information for limiting a function executed by the first communication device and the second communication device; and firmware setting information which is related to a firmware to be installed on the first communication device and the second communication device.

13. A terminal device comprising:

a first wireless interface;

a second wireless interface different from the first wireless interface;

a processor; and a memory storing computer-readable instructions therein, wherein, when the computer-readable instructions are executed by the processor, the terminal device performs functions of:

shifting an operating state of the terminal device from a non-parent station state to a parent station state for forming a wireless network if a predetermined trigger instruction is given, the non-parent station state being a state in which the terminal device does not operate as a parent station of the wireless network, the parent station state being a state in which the terminal device operates as the parent station of the wireless network, and the wireless network being for executing a wireless communication via the first wireless interface;

establishing a wireless connection with a first communication device via the first wireless interface so as to form the wireless network to which the terminal device and the first communication device belong by causing the first communication device to join the wireless network in which the terminal device operates as the parent station, in a case where a first communication link via the second wireless interface is established with the first communication device, the second wireless interface being different from the first wireless interface;

sending predetermined setting information to the first communication device via the first wireless interface by using the wireless network to which the terminal device and the first communication device belong, in a case where the wireless connection is established with the first communication device;

establishing a wireless connection with a second communication device via the first wireless interface so as to form the wireless network to which the terminal device, the first communication device, and the second communication device belong by causing the second communication device to join the wireless network in which the terminal device maintains to operate as the parent station, in a case where a second communication link via the second wireless interface is established with the second communication device while the wireless network to which the terminal device and the first communication device belong is formed and the operating state of the terminal device is maintained as the parent station state without being shifted to the non-parent station state after having been shifted to the parent station state after the wireless connection has been established with the first communication device, the second communication device being different from the first communication device, the second communication link being different from the first communication link; and sending the predetermined setting information that is sent to the first communication device to the second communication device via the first wireless interface by using the wireless network to which the terminal device, the first communication device, and the second communication device belong, in a case where the wireless connection is established with the second communication device.

14. A method performed by a terminal device, the method comprising:

shifting an operating state of the terminal device from a non-parent station state to a parent station state for forming a wireless network if a predetermined trigger instruction is given, the non-parent station state being a state in which the terminal device does not operate as a parent station of the wireless network, the parent station state being a state in which the terminal device operates as the parent station of the wireless network, and the wireless network being for executing a wireless communication via a first wireless interface of the terminal device;

establishing a wireless connection with a first communication device via the first wireless interface so as to form the wireless network to which the terminal device and the first communication device belong by causing the first communication device to join the wireless network in which the terminal device operates as the parent station, in a case where a first communication link via a second wireless interface of the terminal device is established with the first communication device after the operating state of the terminal device has been shifted from the non-parent station state to the parent station state, the second wireless interface being different from the first wireless interface;

sending predetermined setting information to the first communication device via the first wireless interface by using the wireless network to which the terminal device and the first communication device belong, in a case where the wireless connection is established with the first communication device;

establishing a wireless connection with a second communication device via the first wireless interface so as to form the wireless network to which the terminal device, the first communication device, and the second communication device belong by causing the second communication device to join the wireless network in which the terminal device maintains to operate as the parent station, in a case where a second communication link via the second wireless interface is established with the second communication device while the wireless network to which the terminal device and the first communication device belong is formed and the operating state of the terminal device is maintained as the parent station state without being shifted to the non-parent station state after having been shifted to the parent station state after the wireless connection has been established with the first communication device, the second communication device being different from the first communication device, the second communication link being different from the first communication link; and sending the predetermined setting information that is sent to the first communication device to the second communication device via the first wireless interface by using the wireless network to which the terminal device, fir first communication device, and the second communication device belong, in a case where the wireless connection is established with the second communication device.

* * * * *